United States Patent [19]

Ogilvie

[11] Patent Number: 4,739,853
[45] Date of Patent: Apr. 26, 1988

[54] VENTILATED TRACTOR CAB

[76] Inventor: Frank R. Ogilvie, P.O. Box 448, Leavenworth, Wash. 98826

[21] Appl. No.: 935,752

[22] Filed: Nov. 28, 1986

[51] Int. Cl.[4] ............................................. B62D 33/06
[52] U.S. Cl. ............................. 180/89.12; 180/89.14; 296/190
[58] Field of Search ................... 180/89.12, 89.14; 296/190, 102

[56] References Cited

U.S. PATENT DOCUMENTS

| | | | |
|---|---|---|---|
| D. 186,979 | 1/1960 | Stucky | D14/3 |
| 2,052,471 | 8/1936 | Hula | 180/89.12 |
| 2,557,339 | 6/1951 | Campbell | 296/28 |
| 2,583,918 | 1/1952 | Wilson | 296/102 |
| 2,667,379 | 1/1954 | Baze | 296/190 |
| 2,967,073 | 1/1961 | Gagliardi | 296/28 |
| 3,206,245 | 9/1965 | Westrum et al. | 296/102 |
| 3,451,713 | 6/1969 | Hollingshead | 296/28 |
| 3,532,377 | 10/1970 | Grasseler | 296/190 |
| 3,582,132 | 6/1971 | Gunning | 296/190 |
| 3,752,530 | 8/1973 | Voth | 180/89.12 |
| 3,776,358 | 12/1973 | Williams | 296/190 |
| 4,097,085 | 6/1978 | Nelson | 296/190 |
| 4,120,527 | 10/1978 | Lawrence | 296/190 |
| 4,141,429 | 2/1979 | Hale | 180/89.14 |

FOREIGN PATENT DOCUMENTS 2830660 2/1979 Fed. Rep. of Germany ...... 296/190

*Primary Examiner*—Ross Weaver
*Attorney, Agent, or Firm*—Christensen, O'Connor, Johnson & Kindness

[57] ABSTRACT

A cab for a medium-sized farm tractor includes a body portion that is pivotally attached to the chassis of the tractor for pivotal motion between a raised and lowered position. Preferably, the cab is a monocoque structure and is pivotally attached to the tractor at a forward end of the cab so that it pivots about its forward end. The cab and mounting brackets mounting the cab to the tractor are integrated to form a cantilever requiring no other support. The weight of the cab is used to keep the cab in the lowered position and the attachment between the cab and the chassis includes a counterbalance spring that relieves some of the weight of the cab to assist in raising the cab to its raised position. The cab includes a ventilation system that draws air from outside the cab into the interior of the cab. A filter is interposed in the path of the air as it enters the cab to filter out any toxic chemicals and particulate matter from the air. A deflector is installed within the cab in association with the ventilation system to deflect the air entering the cab into the upper portion of the cab so that it flows around the head and shoulders of an operator within the cab. Preferably, a clear plastic dome is mounted on the top of the cab to provide a 360-degree range of vision for the operator. The air deflector cooperates with the dome to cause air from the ventilation system to flow into the dome. The air then follows the interior surface of the dome and surrounds the upper portion of the operator. A rotary windshield wiper is mounted on the exterior of the transparent dome and is operable to remove any foreign substance that may attach itself to the exterior of the dome.

12 Claims, 4 Drawing Sheets

VENTILATED TRACTOR CAB

BACKGROUND OF THE INVENTION

This invention relates to a cab for a farm tractor and, more particularly, to a ventilated cab that is designed for mounting on the tractor after manufacture of the tractor itself, as an after-market item. The cab of the present invention is also intended primarily for use with medium-sized farm tractors used in orchards or vineyards where the trees and vines present interference to equipment that must pass through the orchard or vineyard.

In the cultivation of many types of crops and, in particular, in the management and cultivation of an orchard, it is necessary to apply pesticides, fungicides, and other chemicals to the crops and trees in order to eliminate or prevent infestation by various insects or diseases. It is not uncommon for the chemicals to be applied to also be hazardous to humans and, therefore, the worker operating the applicating system must be protected against contact with and inhalation of the harmful chemicals. In farming of large acreages of crops, such as wheat and corn, very large tractors are typically used to perform the spraying operations and many of these tractors have enclosed cabs that protect the operator of the tractor from the chemicals being applied. However, in smaller farming situations and in orchards where the spacing of the trees prevents the use of large farm tractors, it has been typical to use a smaller, medium-sized farm tractor with no cab, and, therefore, the operator is exposed to the chemicals and pesticides being applied. Typically, an operator has had to wear protective clothing and a respirator to achieve some protection from the pesticides; however, even these are not satisfactory, since the spraying usually occurs during the hottest months of the year and the clothing is uncomfortable to wear and also not totally efficient in preventing contact of the chemicals to the skin of the operator. Also, injuries have been recorded where the operator turned his head to view the "spray pattern" to the rear and while doing so was struck by a branch that inflicted injury to the head, neck, and spine.

It is, therefore, a object of the present invention to provide a cab for use with a small- to medium-sized farm tractor. It is further an object of this invention to provide a cab that is ventilated to aid the comfort of the tractor operator. Another object of the invention is to provide the ventilation system of the tractor with a filtering system that prevents the entry of harmful chemicals or dust into the ventilated space of the cab. Also, it is an object of the present invention to provide such a tractor cab that can be constructed as an after-market item and retrofitted onto existing tractors. Finally, it is an object of the present invention to provide a relatively lightweight cab that is solid enough to prevent injury to the tractor operator by deflecting branches and other low-hanging objects that interfere with the tractor.

SUMMARY OF THE INVENTION

In accordance with the above-staged objects, a tractor cab for use on a medium-sized tractor includes a body portion constructed and arranged to substantially surround the operator of the tractor and pivotably mountable to the tractor body for movement between a lowered position in which it surrounds the operator and a raised position in which it is spaced above the operator to allow the operator ingress and egress from the tractor seat. The cab further includes a window portion that is attached to the body portion and adapted to provide visibility to the operator when the cab is in the lowered position. The cab is also shaped to minimize the interference that it presents to operator vision. A ventilation means is associated with the cab. The ventilation means includes a fan for drawing air from the surrounding environment to the interior of the cab and a filter means interposed in the path of the air as it travels from the outer environment into the cab to filter out any undesirable materials from the air.

Preferably, the cab of the present invention includes an air deflection means associated with the ventilation means to direct the airflow over the head and shoulders of the operator to provide airflow of such volume and velocity as to accelerate evaporation from the operator's body to thereby maximize the cooling effect of the air. Also, in the preferred embodiment the window means includes a transparent, hemispherical dome mounted on top of the cab body portion to provide full 360-degree visibility to the operator of the cab. A wiper and washer means are associated with the dome to wipe the dome and is operable to clear any foreign matter that may accumulate on the exterior surface of the dome.

BRIEF DESCRIPTION OF THE DRAWINGS

The operation and advantages of the present invention will be better understood by those of ordinary skill in the art and others upon reading the ensuing specification when taken in conjunction with the attached drawings wherein.

DETAILED DESCRIPTION OF THE PREFERRED EMBODIMENT

Figure 1:
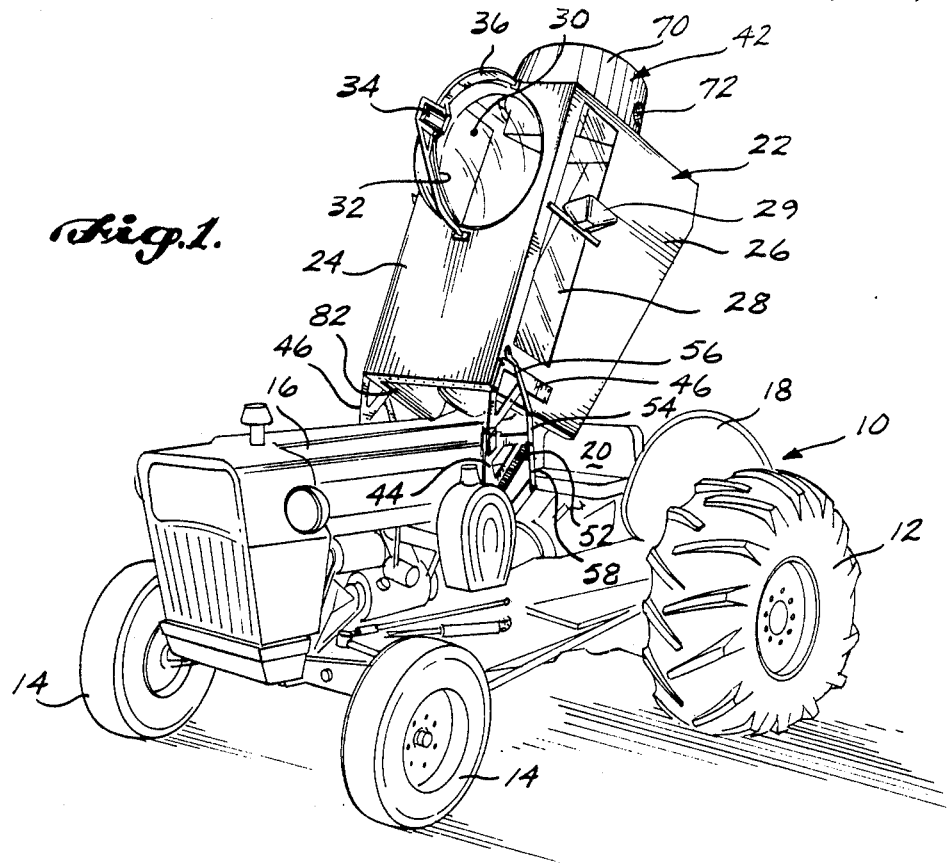
FIG. 1 is an isometric view of a tractor having one embodiment of a cab made in accordance with the principles of the present invention attached thereto, the cab being in a raised position.

FIG. 1 shows a typical medium-sized farm tractor with a cab made in accordance with the principles of the present invention mounted thereon. The cab is shown in the raised position, which allows the tractor operator to mount or dismount the tractor. The cab of the present invention is primarily designed for use with farm tractors of medium size, such as the Massey-Ferguson 250, the John Deere 255, or the Ford 4600. The cab can be used on a wide variety of sizes of tractors and also could be used with other equipment, such as bulldozers or front loaders that did not already have a cab as part of their manufactured form.

Figure 2:
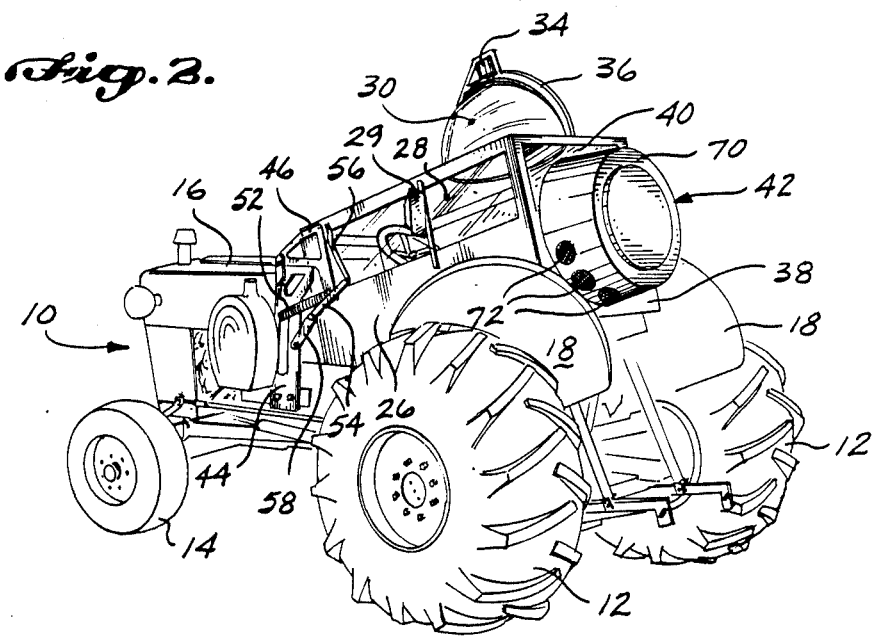
FIG. 2 is an isometric view of the tractor of FIG. 1 having the cab of FIG. 1 mounted thereon in the lowered position.

Referring again to FIG. 1, tractor 10 is a typical farm tractor having a chassis on which is mounted an engine for driving the larger rear wheels 12, and having smaller wheels 14 at the forward end that provide the steering for the tractor. A cowling 16 is shown covering the engine and fenders 18 are positioned to protect the operator from mud and dirt that may be thrown up from the rear wheels 12. Between the fenders 18 is a seat 20 upon which the operator sits. The cab of the present invention includes a body portion 22, which is preferably of monocoque construction and can be made of sheet metal or plastic, the plastic being preferred because of its lower weight in proportion to the strength that can be achieved. The body portion 22 includes a top panel 24 and side panels 26 that extend angularly from the top panel and are adapted to straddle the seat 20 portion of the tractor. Each of the side panels 26 preferably has a window 28 mounted therein, which provides view capability to the operator. In a preferred embodiment the windows 28 are sliders that can be opened to allow the operator to communicate with people outside the cab and to allow easy adjustment of the side mirror 29 mounted on the cab. A clear plastic dome 30 of hemispherical shape is mounted over a hole formed in the top panel 24. The dome 30 provides 360-degree visibility to the operator, as can be seen with the cab in its lowered position as shown in FIG. 2. A curved windshield wiper blade 32 is mounted to a motor 34, which, in turn, is mounted to an arcuate support structure 36 so that the windshield wiper blade is in contact with the exterior of the dome 30. The motor 34 is operable by the operator of the tractor to drive the windshield wiper blade 32 in a circular path around the dome 30 to keep it clear of any foreign matter that may accumulate thereon. The rotation of the blade is controlled by a cam and switch assembly to provide a stopping position of the blade so that the blade will be protected by the support structure 36 when travelling through dense growth. Preferably, a washer system is provided, operable to wash the dome as the wiper wipes over the dome surface. As can best be seen in FIG. 2, the rear of the cab is closed by a panel 38 that is affixed along its edges to the side panels 26 and top panel 24. Preferably, the upper portion of the rear panel 38 has a rear window 40 mounted therein to provide an additional rear view area to the operator. Also, a ventilation means 42 is mounted on the rear panel. The ventilation means 42 will be described in greater detail below.

Figure 4:
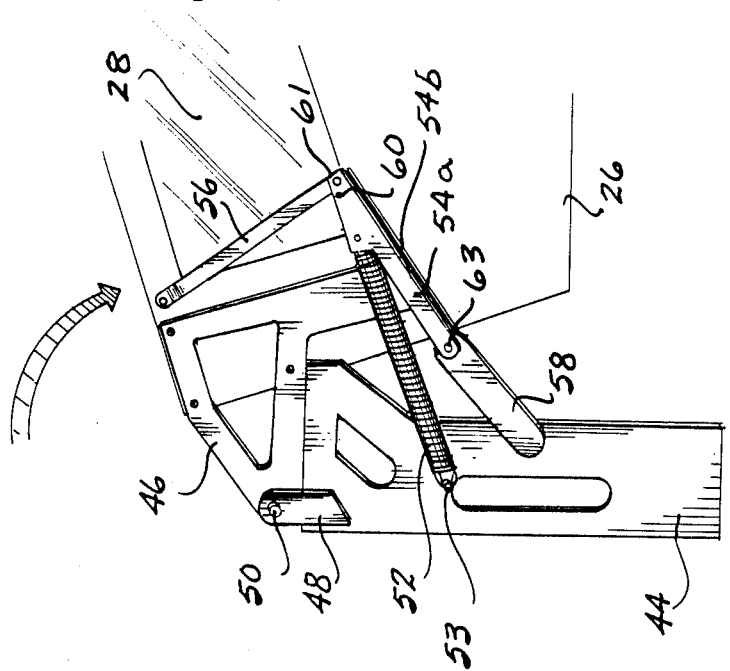
FIG. 4 is a side elevational view of the portion of the tractor cab shown in FIG. 3 with the cab in a lowered position.
Figure 3:
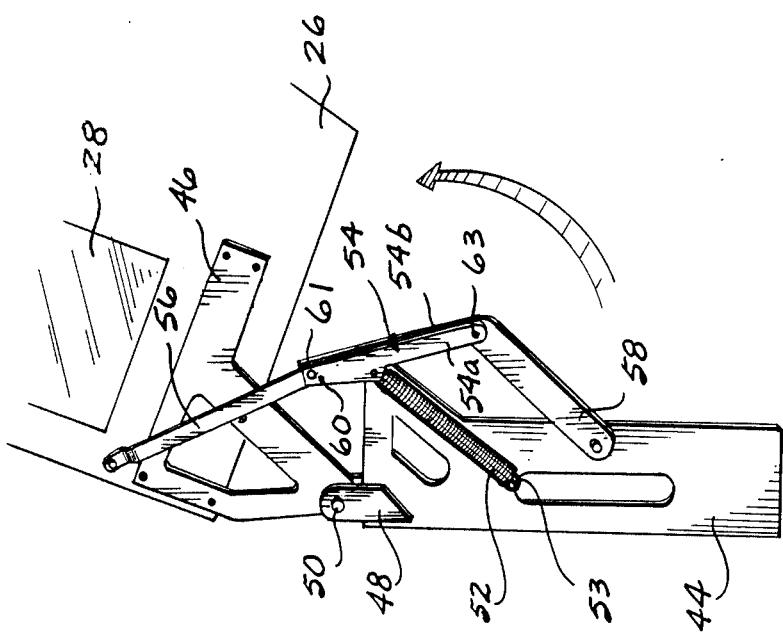
FIG. 3 is a side elevational view of a portion of the cab of FIG. 1 showing the means of attaching the cab to the tractor with the cab in the raised position.

The entire cab structure is pivotally mounted to the chassis of the tractor 10 by a linkage attached to the chassis of the tractor 10 and to the side panels 26. The structure and operation of the linkage are shown in FIGS. 3 and 4. A linkage mounting plate 44 is affixed as by bolts to the tractor chassis. A pivot plate 46 is likewise attached by bolts or rivets to a forward end of the side panel 26 of the tractor cab. A clevis 48 is affixed to the mounting plate 44, such as by welding, and the pivot plate 46 is pinned to the clevis 48 by a pin 50 that passes through the clevis and through a hole in the pivot plate 46. A similar linkage is provided on each side of the cab, although only one linkage is shown and described. This permits the cab to pivot about its forward end between a raised position as shown in FIG. 1 and a lowered position as shown in FIG. 2. By having the cab pivot about its forward end, the weight of the cab can be used to keep the cab down without the need for additional latching mechanisms. Also, by pivoting at the forward end, the force of any object striking the cab as the cab moves forwardly will tend to push the cab down, keeping it in the lowered position. It is particularly helpful in orchard situations where the cab may brush branches on the trees in the orchard. If the cab were to pivot from the rear end of the cab, the branches would tend to lift the cab and it would be necessary to have additional locking means to keep the cab in its lowered position.

In order to lessen the force necessary to raise and lower the cab, a counterbalance spring and linkage system are provided in conjunction with the pivot plates 44 and 46. As can be best seen in FIGS. 3 and 4, a coil spring 52 is attached at a first end to the mounting plate 44 such as by hooking the tang at the first end of the spring onto a pin 53 welded to the plate 44. The second end of the spring is attached to approximately the center of a spring link 54 that is pivotally attached at a first end to a first end of an upper link 56 and pivotally attached at the second end to a first end of a lower link 58. The upper link 56 is in turn pivotally attached at its second end to the side panel 26 of the cab and the lower link is pivotally attached at its second end to the mounting plate 44 below the attachment of the spring 52 to the mounting plate 44. When the cab is in the lowered position, as shown in FIG. 4, the spring 52 is stretched from its relaxed state. The strength of the spring is chosen so that it does not overcome the weight of the cab, so that the weight of the cab keeps the cab in its lowered position. When it is desired to raise the cab, the force of the spring 52 will assist, as the cab is raised, in relieving some of the weight of the cab to make it easier to raise the cab to its raised position as shown in FIG. 3. In the raised position the spring 52 is relaxed. When the cab is in the raised position the spring link 54 and the upper link 56 are offset slightly from a straight line and the force of the spring 52, combined with the linkage 54 and 56, is sufficient to maintain the cab in the raised position. As a safety feature, it is preferable that the link 54 include a stop pin 60, which bears against the lowermost end of the upper link 56 to prevent the link 56 from moving past the center position and allowing the linkage 54 and 56 to collapse, thereby negating the spring force 52 and permitting the cab to fall to its lowered position. In the preferred embodiment illustrated, the spring link 54 is comprised of two parallel elongate members 54a and 54b. The ends of the upper and lower links 56 and 58 fit between the parallel members 54a and 54b and are held by pivot pins 61 and 63 that pass through the respective link members.

Figure 5:
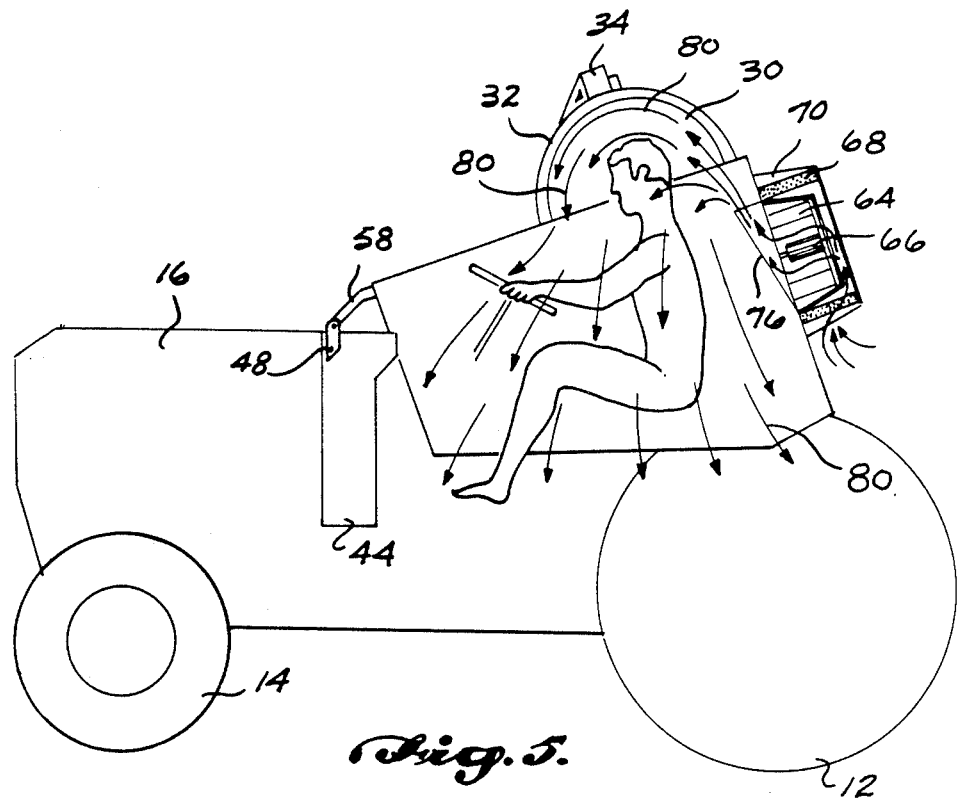
FIG. 5 is a somewhat schematic side elevation of a tractor with a cab made in accordance with the principles of the present invention mounted thereon showing the airflow through the cab from the ventilation means.

FIG. 5 illustrates the airflow through the ventilation means of the cab of the present invention and also demonstrates the position of the driver when the cab is in the lowered position. It can be seen that the dome 30 provides a 360-degree field of vision for the operator and, when used in conjunction with the side windows 28 and rear window 40, provides excellent vision for the operator. The cab is configured so that the rear portion is of sufficient height to allow the operator to sit in the cab with his head in the dome 30. The forward end is of lesser height so that the top panel 24 tilts downwardly toward the forward end of the tractor. The downward tilt permits better visibility for the operator since it keeps the forward end of the top panel out of the operator's line of sight.

The ventilation means 42 includes a squirrel-cage fan 64 that is powered by a motor 66. The fan 64 is mounted on the rear panel 38 adjacent an opening in the rear panel. The fan is surrounded by a filter element 68 and is enclosed within a cylindrical enclosure 70 attached to the rear panel 38. The motor 66 drives the squirrel-cage fan blade 64 and draws air from outside the cab through vent ports 72 formed in the enclosure 70. Preferably, the vent ports 72 are covered by screens to block the passage of large particulate matter and insects into the enclosure 70. As the air passes through the filter element 68 particulate matter, water droplets, toxic chemicals and pollens are all removed from the air so that the air entering the cab is clean. A deflector 76 is attached to the interior side of the rear panel 38 adjacent the opening in the rear panel to deflect the air passing from the ventilator means into the cab upwardly so that it follows the approximate interior contour of the dome 30. The airflow is shown by the arrows 80 in FIG. 5. The airflow pattern shown directs the airflow over the head and neck area of the operator, thereby utilizing the maximum cooling effects from evaporation. The dome 30, besides allowing a 360-degree field of vision, acts as an air deflector itself to move the air around the head of the operator and then downwardly so that the air can exhaust through the open bottom of the cab. Since the fan 64 is drawing air from outside the cab and forcing it through the cab, the air pressure in the cab is raised slightly above ambient air pressure so that dust and particulate matter are kept from entering the cab enclosure through the open bottom. The forward end of the cab is closed by a flexible curtain 82 that hangs from the upper panel 24 and is attached at the sides to the side panels 26. The flexible curtain 82 permits the use of the cab on several different sizes and models of tractor without modification to the cab, since the flexible curtain will conform itself to the shape of the cowling 16 on the tractor, regardless of the particular shape of the cowling.

Figure 6:
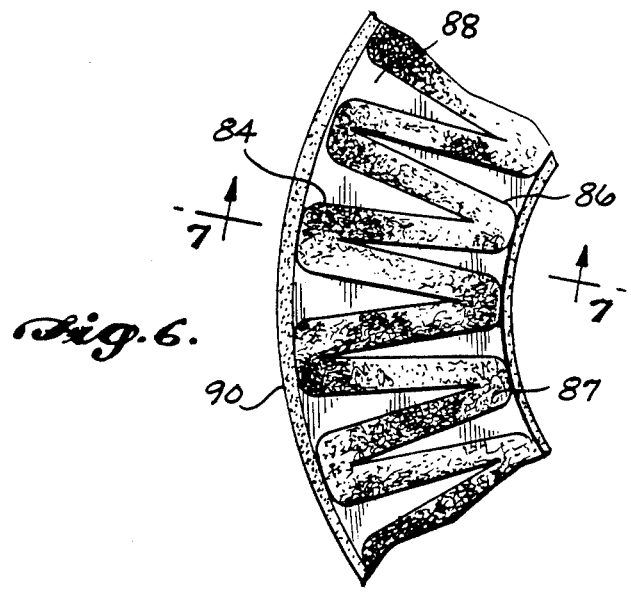
FIG. 6 is a section view of a portion of a filter element made in accordance with the principles of the present invention for use in the ventilation system shown in FIG. 5.
Figure 7:
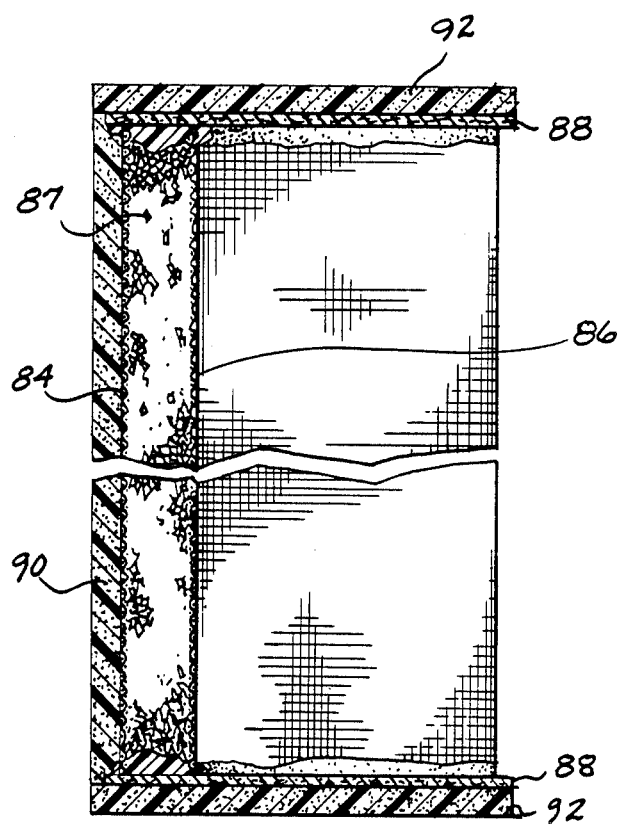
FIG. 7 is a cross-sectional view along line 7—7 of FIG. 6.

FIGS. 6 and 7 show a portion of the filter element 68, preferably in use in the ventilation means 42 used in conjunction with the cab of the present invention. It is significant that the porosity of the filter element 68 be kept sufficiently small to prevent the passage of small particulates through the filter. At the same time, the airflow through the filter element must be maintained at a sufficient level to provide enough airflow to cool the operator even in the typically hot temperatures that occur in the summertime in farming regions. The filter element 68 includes a first screen 84 formed in a serpentine pattern with an approximate S-curve modified to have the outside radii curved and the inside radii in a V-shape, the ends of the screen 84 are joined upon themselves to form an annular ring. A second screen 86 is cooperatively formed to complement the screen 84 and is spaced from the screen 84 to form a double-walled serpentine annular member. In actual practice, a suitable spacing between screens 84 and 86 has been found to be approximately one centimeter. Preferably, both the screen 84 and screen 86 have a facing material applied to them that is a filter material, such as a nonwoven nylon fabric. The fabric acts as a filter to block the passage of particulates of a certain size. A backing ring 88 is adhesively secured to each of the upper and lower edges of the serpentine annular structure comprised of the screens 84 and 86. A material such as cardboard is suitable for the backing material. The space between the screens 84 and 86 is filled with activated charcoal 87 to adsorb moisture and toxic fumes. A urethane foam, not shown, is injected between the charcoal and the backing plates 88. As the urethane foam cures, it expands to tightly pack the charcoal into the space between the two screens and against the respective backing plates 88. The entire cylindrical assembly is covered with an open-cell urethane foam layer 90. The open-cell foam breaks down any water globules that may be entrained in the air passing through the filter so that the moisture is more easily adsorbed by the various filter materials. A gasket 92 of the same open-cell foam is secured to the outer surfaces of the backing plates 88.

In summary therefore, a tractor cab for after-market installation on a medium-sized farm tractor substantially completely encloses the operator of the tractor and has a ventilation system to draw air from outside the cab and distribute it inside the cab in a pattern that utilizes the cooling effect of evaporation to a maximum degree by channeling the air primarily about the head and shoulders of the operator. The cab has a domed window that provides 360-degree vision to the operator and is preferably pivotally attached to the tractor at its forward end so that the cab can be tilted forward to allow ingress and egress by the operator. The cab is held down by its own weight and preferably has a spring-counterbalanced linkage system that attaches the cab to the tractor chassis; the counterbalance spring assists in relieving some of the weight of the cab to make it easier to raise the cab to its raised position. Preferably, the cab is made of ABS plastic and is monocoque in design, although the cab could be made of metal, such as aluminum sheet, if desired. The ventilation system includes a fan that draws air from the outside in through an opening in the cab and distributes it to the cab interior. A filter element is interposed in the path of the air as it enters the ventilation means. The filter element preferably has a mass of activated charcoal captured between spaced screen members. The screen members preferably have a nonwoven fabric covering each of their faces, which acts as an additional filtering element.

While a preferred embodiment of the tractor and ventilation system of the present invention has been described and illustrated, it will be understood by those of ordinary skill in the art and others that changes can be made to the illustrated and described embodiment while remaining within the scope of the invention. For example, while a preferred filter arrangement has been described, other filter arrangements may be used as long as they suitably filter out any toxic fumes and particulate matter from the air that is allowed to reach the interior of the cab. Also, the particular material from which the cab is constructed can be changed to fit any particular use or environment. Since changes can be made to the illustrated and described embodiment, the invention should be defined solely with reference to the appended claims.

The embodiments of the invention in which an exclusive property or privilege is claimed are defined as follows:

1. For use with an open vehicle having a chassis and a seat mounted on said chassis on which an operator of the vehicle sits, a cab comprising:
    a body portion including a top panel and first and second side panels depending from said top panel to define an operator space;
    means for pivotally attaching said body portion to said chassis for movement of said body portion between a lowered position in which said body portion encompasses the area normally occupied by the operator and a raised portion in which the body portion is spaced from the area normally occupied by the operator to allow the operator access to the seat;

a rear panel affixed along its edges to said top and side panels, said rear panel having an air entry opening formed therein;

ventilation means mounted on said rear panel in communication with said air entry opening for drawing air from outside said cab through said air entry opening;

filter means associated with said ventilation means for filtering air drawn into said air entry opening;

air-deflecting means attached to the interior surface of said rear panel adjacent said air entry opening, said air-deflecting means being constructed and arranged to direct air drawn in by said ventilation means into the cab area occupied by said operator; and a dome of transparent material affixed to said top panel in register with an opening formed in said top panel wherein said deflecting means directs airflow from said entry opening into said dome.

2. The cab of claim 1, wherein said dome is substantially a hemisphere.

3. The cab of claim 1, wherein said ventilation means includes:

a fan mounted adjacent said air entry opening to draw air from the exterior of said cab into said air entry opening;

a cylindrical filter element surrounding said fan; and a filter housing encompassing said cylindrical filter and having at least one port formed therein.

4. The cab of claim 3, wherein said fan is a squirrel-cage fan.

5. The cab of claim 1, wherein said pivotal attaching means are mounted at a forward end of said body portion so that said body portion pivots about its forward end between said raised and lowered positions.

6. The cab of claim 5, wherein said body portion is cantilevered from said pivotal attachment means so that the weight of said body portion keeps the cab in its lowered position.

7. The cab of claim 6, wherein said pivotal attachment means further includes a counterbalancing spring connected between said chassis and said body portion and acting to counterbalance the weight of said cab to aid in raising said cab from its lowered position to its raised position.

8. The cab of claim 7, wherein said pivotal attachment means includes a mounting plate affixed to said chassis, a pivot plate attached to said body portion side panel, and a pivot pin passing through holes formed in said mounting plate and said pivot plate.

9. The cab of claim 3, wherein said cylindrical filter element includes:

a first screen formed in an S-shape and having its first and second ends joined to form a ring;

a second screen formed to cooperate with said first screen and positioned in spaced relation to said first screen so as to form an annular space of S-wave cross section;

an adsorbent material packed into said annular space;

sealing means affixed to the edges of said first and second screens to seal said adsorbent material within said space; and a layer of open-cell foam surrounding said screens.

10. The filter of claim 9, wherein said adsorbent material is activated charcoal.

11. The filter of claim 9, further including a nonwoven fabric facing affixed to each of said first and second screens.

12. The filter of claim 9, wherein said sealing means is urethane foam.

* * * * *